Figure 6:
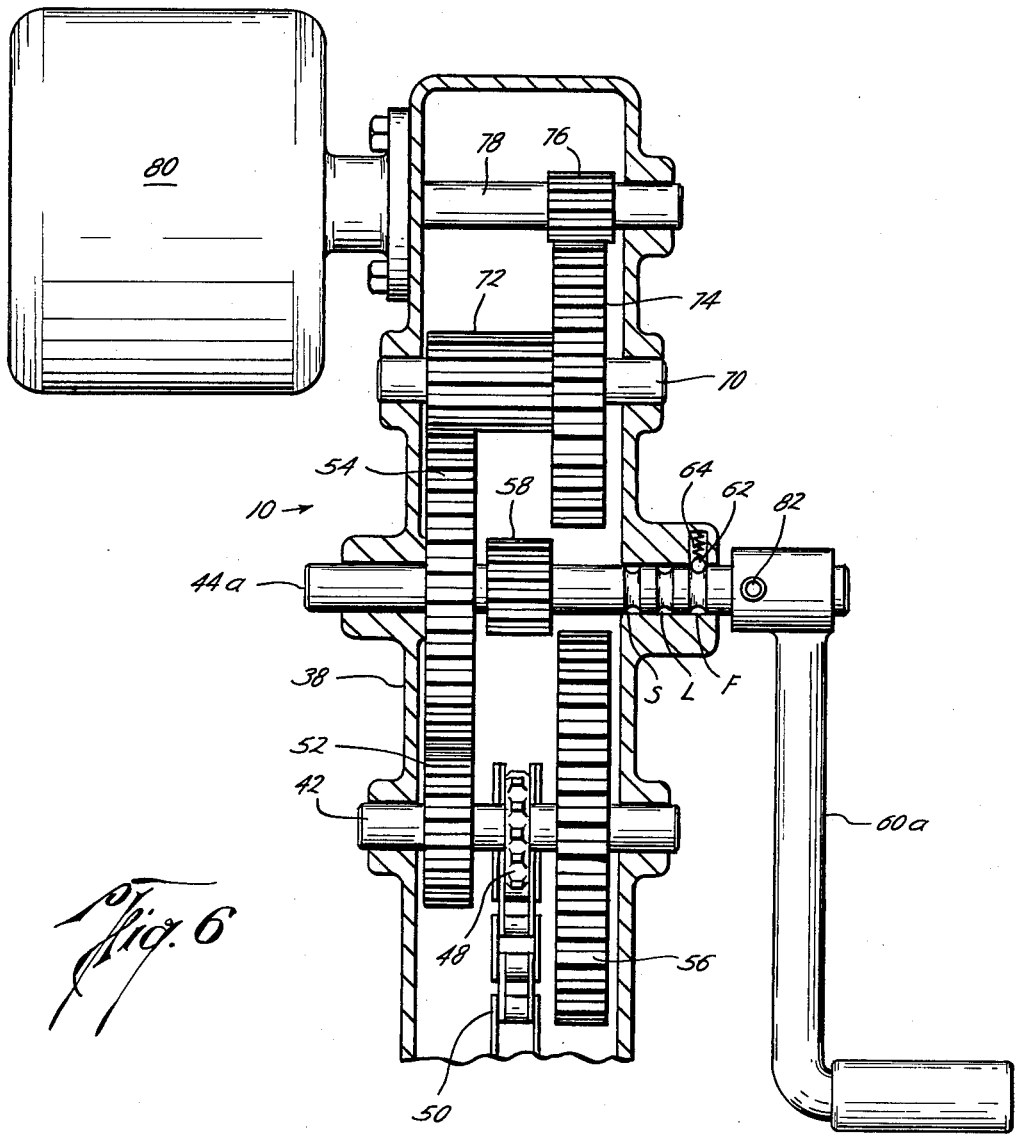

Oct. 1, 1963     W. L. BLACKBURN     3,105,675
SCREW CONNECTOR FOR BARGES OR THE LIKE
Filed July 11, 1961     3 Sheets-Sheet 1
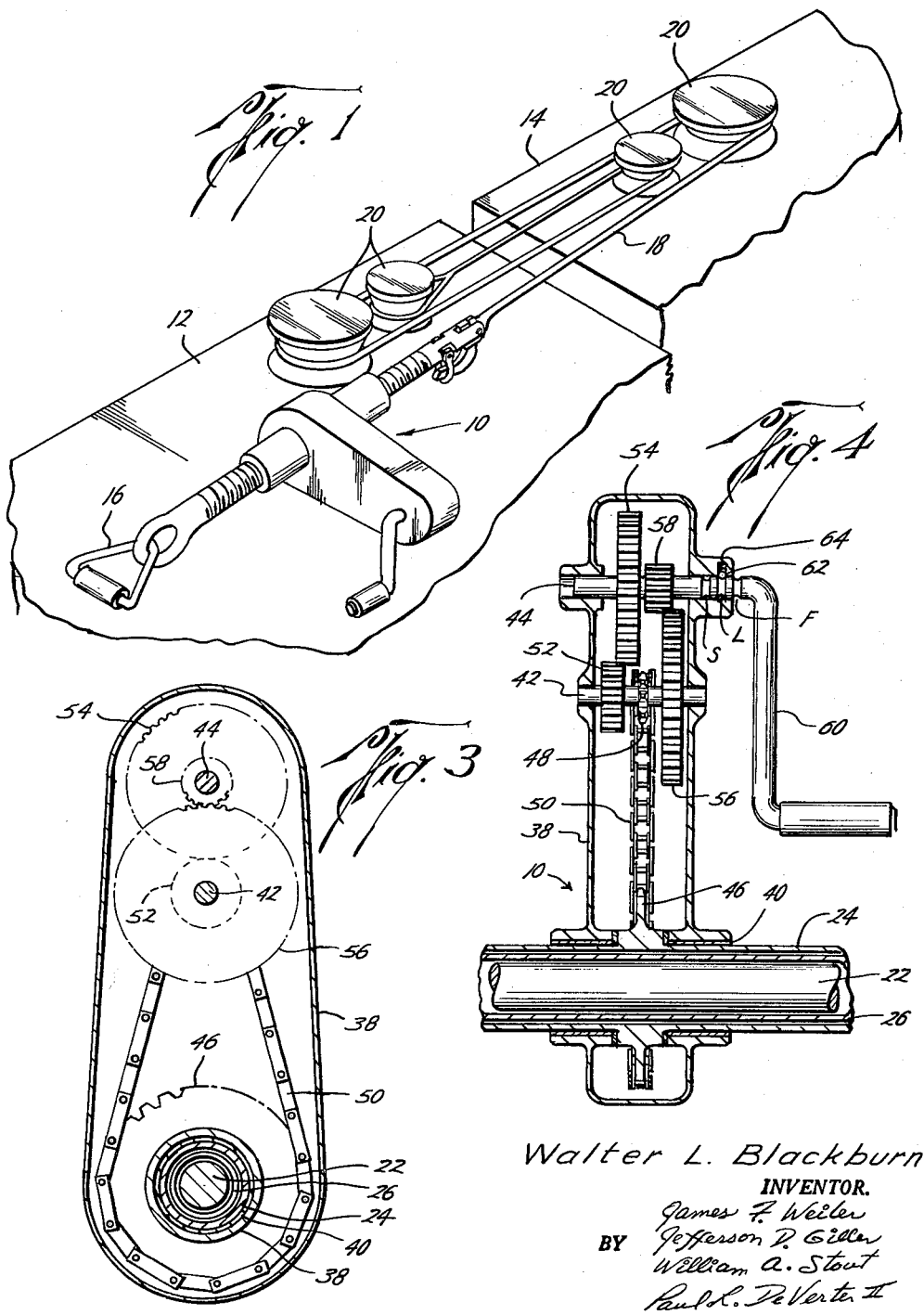
Walter L. Blackburn
INVENTOR.
James F. Weiler
BY Jefferson D. Giller
William A. Stout
Paul L. DeVerter II
ATTORNEYS

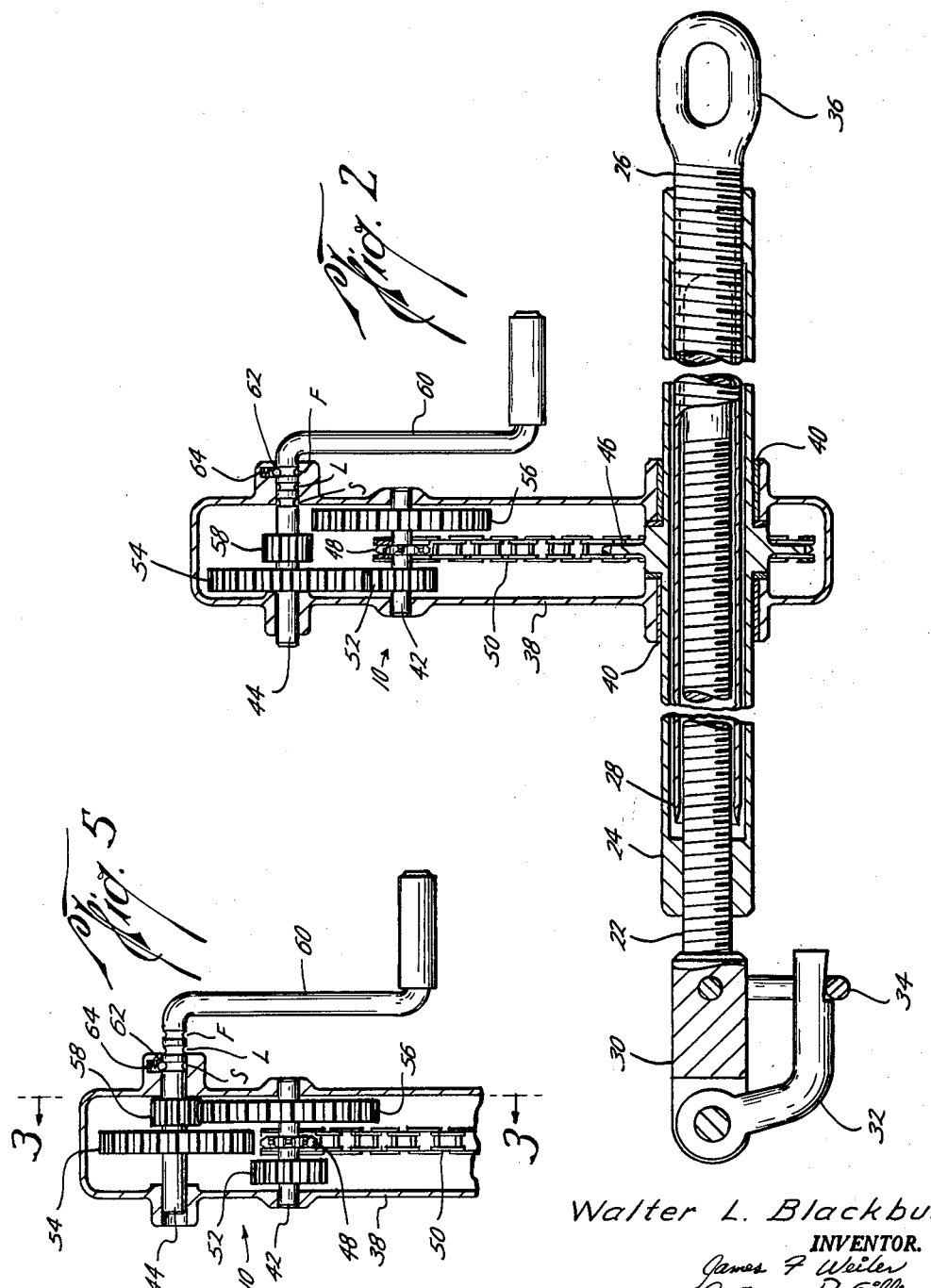

Walter L. Blackburn
INVENTOR.

BY James F. Weiler
Jefferson D Giller
William A. Stout
Paul L. DeVerter II
ATTORNEYS ID # United States Patent Office 3,105,675
Patented Oct. 1, 1963

3,105,675
SCREW CONNECTOR FOR BARGES OR THE LIKE
Walter L. Blackburn, 6501 England St., Houston, Tex.
Filed July 11, 1961, Ser. No. 123,200
8 Claims. (Cl. 254—67)

The present invention relates to an improved screw connector and more specifically to a telescoping screw connector having provision for changing the mechanical advantage, which is particularly useful in the efficient makeup of a train of barges or the like.

For almost ninety years, the Patterson steamboat ratchet has been extensively used as a barge connector on the inland waterways of the world. With suitable shackles, hooks, eyes, or the like on either or both ends, this portable tightening and tensioning device still remains popular. However, the Patterson steamboat ratchet is limited in working length, mechanical advantage, and operational speed.

The present invention is directed to an improved steamboat ratchet which utilizes telescoping screws to increase the working length of the connector without increasing its physical length. Further, the improved screw connector of the present invention utilizes readily changeable gearing means to alter the mechanical advantage, efficiency, and decrease the makeup time required for connecting barges, or the like. The present invention also includes a locking means to retain imparted tension and rotating means to further increase the speed of operation.

It is, therefore, an object of the present invention to provide an improved screw connector wherein the screws may telescope one into the other, whereby the working length is increased without increasing the overall length of the device.

Another object of the present invention is to provide gearing means whereby the mechanical advantage of the screw connector may be readily adjusted, thereby increasing the connector's efficiency.

Still another object of the present invention is to provide means for locking the gears and thereby the screws at any desired position.

Yet another object of the present invention is to provide rotating means for operating the screw connector whereby the connector's efficiency is further increased, which rotating means may be a crank or a motor.

Another object of the present invention is to provide a simple, rugged screw connector which is convenient to use and readily understood by its operator.

Other and further objects, features and advantages will be apparent from the following description of a presently preferred embodiment of the invention, given for the purpose of disclosure, taken in conjunction with the accompanying drawings, where like character references designate like parts throughout the several views, and where:

FIGURE 1 is a pictorial representation showing an embodiment of the present invention being utilized to make up barges with the use of an appropriate cable and deck fittings, FIGURE 2 is a partial sectional view of an embodiment of the present invention with an eye on one end and a pelican hook on the other and showing the gearing mechanism in position for rapid movement of the screws, FIGURE 3 is a partial sectional end view of the present invention taken along the line 3—3 of FIGURE 5, FIGURE 4 is a partial sectional side view, similar to FIGURE 2, showing the gearing and screw mechanism when locked, FIGURE 5 is a partial sectional side view, also similar to FIGURE 2, showing the gearing in position for exerting the maximum mechanical advantage, and FIGURE 6 is a partial sectional side view, also similar to FIGURE 2, showing the addition of a motor to operate the gearing.

The present invention generally comprises a pair of screws, one of which telescopes into the other, and both of which threadedly telescope into a body. Attached to the body is a rotation imparting means which may include a sprocket mounted on the body and a similar sprocket mounted on an idler shaft journaled in a housing. Associated with the idler shaft are gears which are rotatable by a hand crank external of the housing, and the hand crank also includes means for engaging various pairs of gears with the idler shaft to change the mechanical advantage from the crank to the telescoping screws. Further, a motor may be utilized to rotate the gears while retaining the gear changing features.

Referring now to the drawings, and particularly FIGURE 1, the screw connector 10 is shown being utilized to tie barges 12 and 14 together. Thus, one end of the screw connector 10 is attached to the barge 12 through a suitable deck fitting 16 and the other end is attached to the cable 18, which is in turn wrapped around the buttons 20. As will become apparent hereinafter, operation of the screw connector 10 will apply tension to the cable 18 and draw the barges 12 and 14 tightly together.

Referring now to FIGURE 2, a detailed sectional side view of the screw connector 10 is shown. The small screw 22 is threaded into one end of the body 24, while the large screw 26 is threaded into the other. The internal end 28 of the large screw 26 is drilled or bored out so that the internal diameter of the large screw 26 is slightly larger than the diameter of the small screw 22. Thus, as shown, the small screw 22 telescopes within the hollow end of the large screw 26 when both screws are threaded inwardly toward the center of the body 24. The ends of the screws may be appropriately beveled to ease their entrance. Attached to the exposed end of the small screw 22 is a pelican hook 30, which comprises an L-shaped arm 32 which is held in place when in use by the keeper 34. Attached to the exposed end of the large screw 26 is an eye 36. It is apparent, of course, that other well known rigging fittings such as hooks or shackles may be similarly substituted for the pelican hook 30 and eye 36 shown.

The threads on the small screw 22 are left-handed threads of a certain pitch. The threads on the large screw 26 are right-handed threads having the same pitch as the threads on the small screw 22. In this manner, as with conventional turnbuckles, rotation of the body 24, while the screws 22 and 26 are held against rotational movement, will result in moving the exposed ends of the screws 22 and 26 inwardly or outwardly at the same time. Of course, the small screw 22 may have right-hand threads and the large screw 26 left-hand threads, to achieve the same result. It is only necessary that the threads on each screw be opposite. It is preferred that the pitch of the threads on each screw be identical, so that rotation of the body 24 will result in equal axial movement of each screw 22 and 26.

By the provision of utilizing a large hollow screw and a small screw which telescopes therein, it is readily seen that the working length of the present invention is almost twice that of the prior art devices because the length of screw travel is not limited to ½ the length of the body. Therefore, advantageously, the utility of the present invention is substantially increased without increasing the length of the body.

Rotatably mounted upon the body 24 is a housing 38. Suitable bearings 40 may be utilized to reduce the rotational friction between the body 24 and the housing 38. Rotatably mounted in the housing 38 is an idler shaft 42 and a crank shaft 44. Rotation transmitting means interconnect the idler shaft 42 and the body 24, and these means are here shown as a sprocket 46 attached to the body 24, a sprocket 48 attached to the idler shaft 42, and a chain 50 interconnecting the sprockets 46 and 48. The sprocket 48 is somewhat smaller in diameter than the sprocket 46, thereby increasing the mechanical advantage between the idler shaft 42 and the body 24. Of course, it is apparent that other conventional devices may be utilized for the rotation transmitting means just described, such as a train of spur gears (not shown). The use of these rotation transmitting means advantageously separates the crank 60 (hereinafter described) from the body 24, to provide room for manipulation and to reduce the danger of mashed fingers.

Mounted on the idler shaft 42 is a small spur gear 52 which is designed to mesh with a large spur gear 54 mounted on the crank shaft 44. In FIGURE 2, these spur gears 52 and 54 are shown when engaged or meshed. Also mounted on the idler shaft 42 is a large spur gear 56 which is designed to mesh with a small spur gear 58 mounted on the crank shaft 44. In FIGURE 2 the spur gears 56 and 58 are shown out of mesh or disengaged. As will be explained hereinafter, the spur gears 52 and 54 may be readily disengaged, and the spur gears 56 and 58 readily engaged.

The crank shaft 44 is designed not only for rotational movement within the housing 38, but also axial movement therein. Attached to the crank shaft 44 is a crank 60 which is utilized primarily to impart rotational movement to the crank shaft 44. However, the crank 60 is also used to move the crank shaft 44 axially within the housing 38. In the embodiment shown of the present invention, three axial positions of the crank shaft 44 are contemplated. These positions are readily seen by comparing FIGURES 2, 4, and 5.

Thus, as in FIGURE 2, when the crank shaft 44 is moved to the left, rotational movement imparted to the crank shaft 44 by the crank 60 is imparted through the spur gear 54 to the spur gear 52, idler shaft 42, sprocket 48, chain 50, sprocket 46, and thus to the body 24. In this position, the mechanical advantage of the screw connector 10 is at a minimum because gear 54 is larger than gear 52, and therefore operation of the crank 60 will quickly result in axial movement of the threaded screws 22 and 26.

Referring now to FIGURE 5, the crank shaft 44 is shown moved axially to the right within the housing 38. In this position the spur gears 52 and 54 are disengaged, while the spur gears 58 and 56 are engaged. Therefore, rotation imparted to the crank shaft 44 by the crank 60 results in increased mechanical advantage being imparted to the screws 22 and 26, since the spur gear 58 is smaller than the spur gear 54 and therefore more revolutions of the crank shaft 44 are required to impart the same rotational movement to the body 24. Thus, in FIGURE 5, rotation imparted to the crank shaft 44 by the crank 60 is imparted through spur gear 58 to spur gear 56, idler shaft 42, sprocket 48, chain 50, sprocket 46, body 24, and thus axial movement of the screws 22 and 26 results. These latter elements are not seen in FIGURE 5, but may be seen by referring to the sectional end view of FIGURE 3 which also shows the concentricity of the screws 22 and 26 and body 24.

With reference now to FIGURE 4, the crank shaft 44 is shown in a middle position between those previously shown in FIGURES 2 and 5. In this position, the spur gear 54 is engaged or meshed with spur gear 52, and the spur gear 58 is meshed with the spur gear 56. Although the full faces of these various spur gears are not engaged, it is apparent that the crank shaft 44 cannot be rotated when in this axial position. Thus, the crank shaft 44 and idler shaft 42 are locked due to the different pitch diameters of the various spur gears, and therefore the sprocket 48, chain 50, sprocket 46, and body 24 are similarly locked against rotational movement. Advantageously, therefore, the present invention incorporates simple yet effective means for locking the screw connector 10 a any desired extension of the screws 22 and 26. It is preferred that the gears be so placed on the shafts that a least one pair of gears is always meshed. In this manner the operator will always have control over the moving parts of the screw connector.

Means are also provided for releasably holding the crank shaft 44 in any of the three above mentioned axial positions. In the preferred embodiment of the present invention, these means comprise a spring biased detent Thus, extending about the crank shaft 44 are three grooves denoted F, L, and S. Yieldingly urged into one of the grooves is a ball 62 biased by a spring 64 which is mounted in the housing 38. When, as in FIGURE 4, the ball 62 is yieldingly urged into the groove L, the spur gears 54, 52, 58, and 56 are locked, and thus the screw connector 10 is locked. And, with reference to FIGURE 2, when the ball 62 is yieldingly urged into groove F, the screw connector 10 is positioned for fast movement of the screws 22 and 26, with the minimum mechanical advantage, because, as previously mentioned, rotational movement of the crank shaft 44 through the spur gear 54 to the idler shaft 42 results in a gearing speed increase. In a similar manner, now with reference to FIGURE 5, when the crank shaft 44 is axially moved so that the ball 62 is yieldingly urged into the groove S, the screw connector 10 is positioned for slow movement of the screws 22 and 26. This, as mentioned above, results from the gearing speed reduction imparted by the engagement of the spur gears 58 and 56 between the crank shaft 44 and the idler shaft 42.

It is, of course, apparent that the utilization of the crank 60 results in increased operational speed over the prior art devices. Previously a lever and ratchet arrangement has been used which requires that relatively inefficient reciprocating motion must be imparted to the lever. However, advantageously, the present invention utilizes a crank 60 which is much more efficiently operated by a deck hand or the like. Although only one crank 60 is shown attached to the crank shaft 44, it is well within the skill of the art to place a similar crank on the other end of the crank shaft 44 for two-handed operation of the screw connector 10.

Referring to FIGURE 3, it is seen that the distance between the centers of the crank shaft 44 and the idler shaft 42 is a certain fixed distance and therefore any combination of spur gears may be utilized therebetween so long as the sum of the pitch diameters of each pair of spur gears equals that of all other pairs of spur gears. It is also contemplated that more than two pairs of spur gears may be utilized when interconnecting the crank shaft 44 and the idler shaft 42, simply by widening the housing 38 and lengthening the shafts 42 and 44.

In use, as when drawing two elements together, such as the barge 12 and the barge 14, either screw of the screw connector 10 is attached to the barge 12 through an appropriate deck fitting, such as 16, and the other screw of the screw connector 10 is attached to the other barge 14, such as through the cable 18. Thereupon, to quickly remove the slack, the crank 60 is pushed toward the housing 38 thus moving the crank shaft 44 axially so that the spring biased detent engages the groove F. Then an operator imparts rotary motion to the crank 60 thus rotating the crank shaft 44, spur gears 54 and 52, idler shaft 42, sprocket 48, chain 50, sprocket 46, and thus the body 24. Rotational movement of the body 24 thereupon axially moves the screws 22 and 26 in opposite directions, due to their opposite threads. The rotational movement imparted to the crank 60 is continued until the slack is removed and resistance is encountered. Thereupon, the crank 60 is pulled outwardly away from the housing 38 thereby axially moving the crank shaft 44 so that the groove S therein is engaged by the spring detent. Now, referring to FIGURE 5, rotation of the crank 60 rotates the crank shaft 44, spur gears 58 and 56, idler shaft 42, sprocket 48, chain 50, sprocket 46 and therefore body 24. The mechanical advantage of the screw connector 10, when the spring detent is in groove S, is materially increased, for the spur gear 58 is smaller than the driven spur gear 56. This increase in mechanical advantage allows the screw connector 10 to impart greater tension to the cable 18 when the same amount of force is applied to the crank 60.

When the desired amount of tension has been imparted to the cable 18, the crank 60 is moved axially so that the groove L engages the spring detent and therefore the various spur gears are locked, as in FIGURE 4. In this manner, the tension imparted to the cable 18 is retained. When it is desired to release the connection between the barges 12 and 14, the crank 60 is pulled outwardly away from the housing 38 so that the groove S is engaged by the spring detent and the crank 60 is rotated to release the tension imparted to the cable 18. Thereupon, the crank 60 is pushed inwardly toward the housing 38 so that the groove F engages the spring detent and the crank 60 is turned to rapidly produce slack in the cable 18 so that it may readily be disengaged from the appropriate deck fittings 20. Depending upon the mechanical advantage selected by the pitch of the screws, it may sometimes be possible to eliminate the step of first axially moving the crank shaft 44 to position S when releasing cable 18 tension.

When appropriate power means are available it will, of course, be advantageous to provide a motor to rotate the gearing and drive the telescoping screws. Therefore, with reference now to FIGURE 6, an embodiment of this modification is shown, wherein like parts are designated as hereinabove and slightly modified items include the addition of the suffix a. Rotatably journaled in the housing 38 is a second idler shaft 70 to which are keyed the pinion 72 and spur gear 74. The pinion 72 is meshed or engaged with the large spur gear 54, while the spur gear 74 is engaged with the motor pinion 76. The motor pinion 76 is fixed to the shaft 78 which is journaled in the housing 38 and is operatively connected to the motor 80. The connection between the shaft 78 and motor 80 may be direct or may include an appropriate conventional clutch (not shown) for a purpose to be described. The motor 80 itself may be of any conventional design, such as electric, hydraulic, or pneumatic, with appropriate power connecting means, and is preferably explosion and water proof, particularly when used around barges, or the like.

The pinion 72 has a large face, so that axial movement of the shaft 44a and attached spur gear 54 does not disengage the pinion 72 and spur gear 54. Therefore, rotation of the motor pinion 76 results in rotation of spur gear 74, pinion 72, spur gear 54, and shaft 44a, no matter whether the spring detent ball 62 is engaged in groove S or F. The diameter of gears 58 and 74 are such that they are never meshed. As before with crankshaft 44, the axial placement of the shaft 44a controls the changeable mechanical advantage delivered to the telescoping screws 22 and 26.

The construction of the shaft 44a and crank 60a differs only slightly from that previously described. When the motor 80 is utilized to rotate the gearing, as a matter of safety it would be better not to have the exposed crank 60a rotating. Therefore, means are provided for disengaging the crank 60a from the shaft 44a. Thus the crank 60a is releasably engaged with the shaft 44a by the use of a removable pin 82. When the pin 82 is removed, the crank 60a may be readily slipped off the shaft 44a, and laid aside until needed when shifting the shaft 44a axially to change the gearing ratio or mechanical advantage.

In use, the shaft 44a is shifted axially until the spring detent engages groove F. Then, after the extended telescoping screws are appropriately attached to the items to be tensioned, the motor 80 is energized, thereby rotating pinion 76, gear 74, pinion 72, gear 54, gear 52, sprocket 48, and so on as previously described with reference to FIGURE 2. The screws 22 and 26 are quickly pulled together until the motor begins to stall. Thereupon, the motor 80 is de-energized and shaft 44a is shifted axially so that the spring detent engages groove S, preferably by temporarily reattaching crank 60a and pin 82. The motor 80 is again energized to rotate pinion 76, gear 74, pinion 72, gear 54, gear 58, gear 56, sprocket 48, and so on as previously described with reference to FIGURE 5, thereby increasing the mechanical advantage and completing the tensioning.

As mentioned above, the motor 80 may include a conventional clutch to prevent overheating when stalled or to limit the total force applied to the screws. Further, if power means for the motor 80 are not available, the clutch may be utilized to disengage the shaft 78 from the motor 80, whereupon the crank 60a may be utilized, just as was crank 60, to manipulate the present invention.

After the tensioning is completed, the motor 80 is de-energized and shaft 44a may be shifted laterally so that the spring detent engages groove L, thereby locking the screw connector as previously discussed with reference to FIGURE 4. To release the screw connector of FIGURE 6, the shaft 44a is merely shifted so that the spring detent engages groove S or F, and the motor 80 is rotated in a direction to extend the screws 22 and 26 in a manner previously described with reference to the non-motored screw connector. The purpose of the pinion 76 and gear 74 is merely to effect a speed reduction of the motor 80, and it is within the skill of the art to increase or reduce this speed reduction consonant with the character of the motor 80 and desired speed and force of the movement of the telescoping screws 22 and 26.

In this manner, the present invention provides a simple and rugged screw connector with increased working length, means for changing the mechanical advantage, locking means to retain imparted tension, and a rotating means to further increase the speed and convenience of operation. While the present invention has been particularly described with reference to barges or the like, its use is not intended to be limited thereto.

The present invention, therefore, is well adapted to carry out the objects and attain the ends and advantages mentioned as well as others inherent therein. While a presently preferred embodiment of the present invention is given for the purpose of disclosure, numerous changes in the details of construction and the combination, shape, size and arrangement of parts may be resorted to without departing from the spirit and scope of the invention as hereinafter claimed.

What is claimed is:

1. In a screw connector for barges or the like, a housing, a body rotatably mounted in said housing, a pair of oppositely threaded screws threadably engageable with said body, one of said screws telescopable into the other of said screws, a crank shaft journaled in said housing, an idler shaft rotatably mounted in said housing, chain and sprocket means rotatably interconnecting said idler shaft and said body, speed changing gearing means rotatably interconnecting said crank shaft and said idler shaft, and rotating means operatively connected to said crank shaft.

2. The invention of claim 1 wherein said crank shaft is axially movable in said housing and said gearing means includes more than one pair of gears, each pair having a different ratio, one of each pair mounted on said idler shaft, the other of each pair mounted on said crank shaft, and each pair independently engageable upon axial positioning of said crank shaft.

3. The invention of claim 2 wherein more than one pair of said gears are engageable at intermediate axial positions of said crank shaft, thereby locking said crank shaft and said idler shaft against rotation.

4. The invention of claim 3 including spring detent means releasably engaging said crank shaft in various axial positions.

5. The invention of claim 4 wherein said rotating means includes a hand crank external to said housing and attached to said crank shaft.

6. The invention of claim 4 wherein said rotating means includes a motor mounted on said housing operatively connected to said crank shaft and a hand crank demountably attached to said crank shaft external to said housing.

7. In a screw connector for barges or the like having a housing, a body rotatably mounted in said housing, a pair of oppositely threaded screws threadably engageable with said body, the improvement in rotating means for rotating said body and the pair of threaded screws comprising: a crank shaft rotatably mounted in said housing, an idler shaft rotatably mounted in said housing, rotatable drive means interconnected between said idler shaft and said body, two pairs of gears, each pair having a different ratio, one of each pair of said gears mounted on said idler shaft, the other of each pair mounted on said crank shaft, said gears being positioned for independent engagement of each pair on axial positioning of the gears on one of said shafts.

8. The invention of claim 7 wherein both pair of said gears are engageable at an intermediate axial position thereby locking said crank shaft and said idler shaft against rotation.

References Cited in the file of this patent

UNITED STATES PATENTS

| | | |
|---|---|---|
| 310,767 | Wilson | Jan. 13, 1885 |
| 697,629 | Keiper | Apr. 15, 1902 |
| 824,216 | Stewart | June 26, 1906 |
| 853,734 | Reichert | May 14, 1907 |
| 1,273,747 | Davidoff | July 23, 1918 |
| 1,448,853 | Manley | Mar. 20, 1923 |